Feb. 1, 1966                F. G. UMHOLTZ                3,233,092
                        PORTABLE RECHARGEABLE LAMP
Filed Dec. 11, 1964                                   4 Sheets-Sheet 1

INVENTOR.
FRANKLYN G. UMHOLTZ
BY
Buehler & Grant
ATTORNEYS

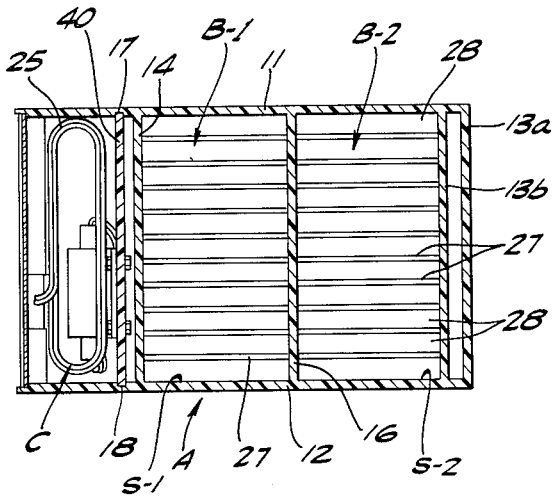
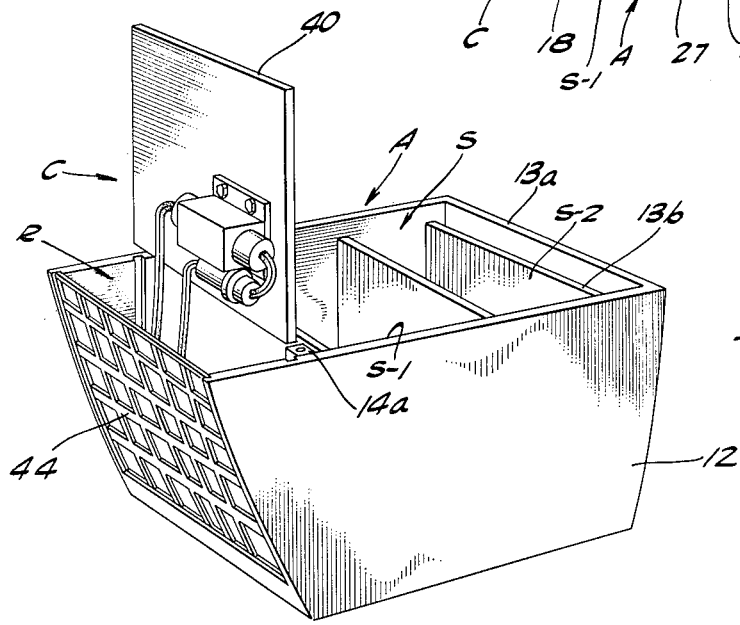
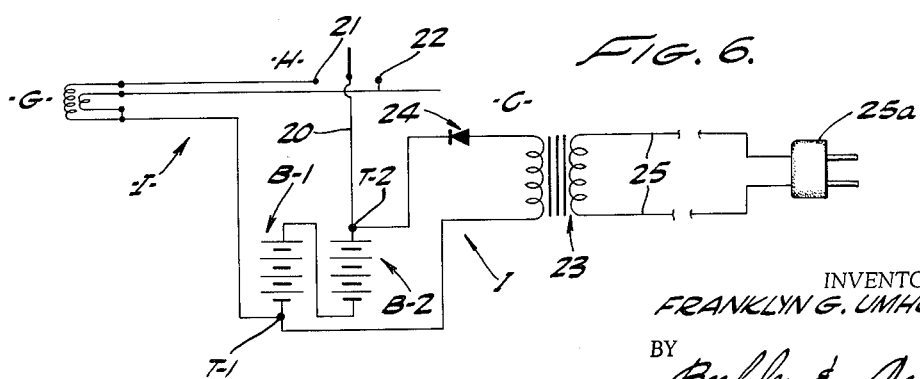

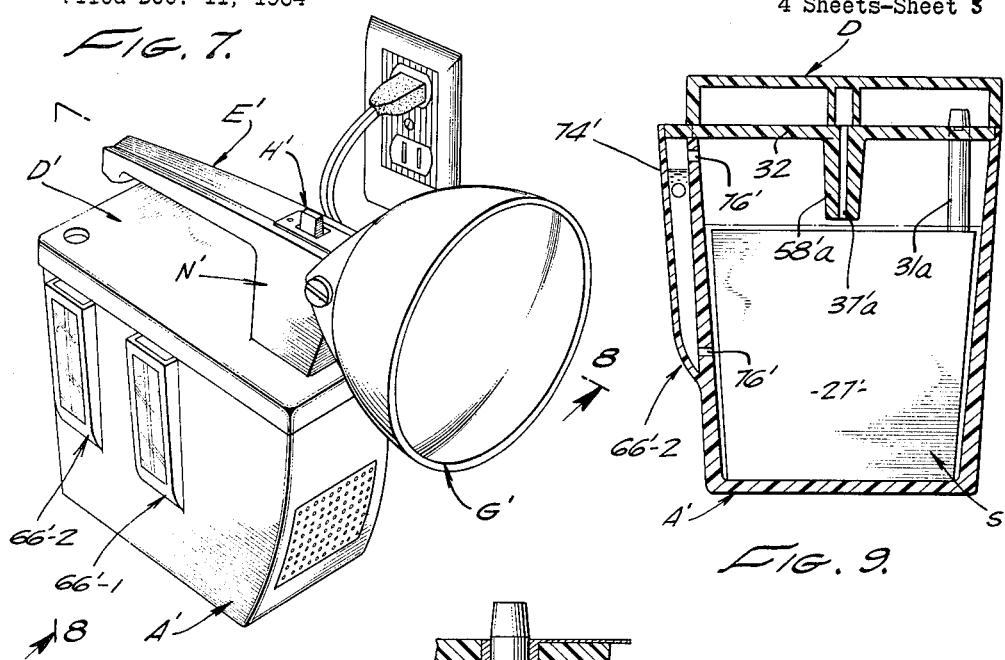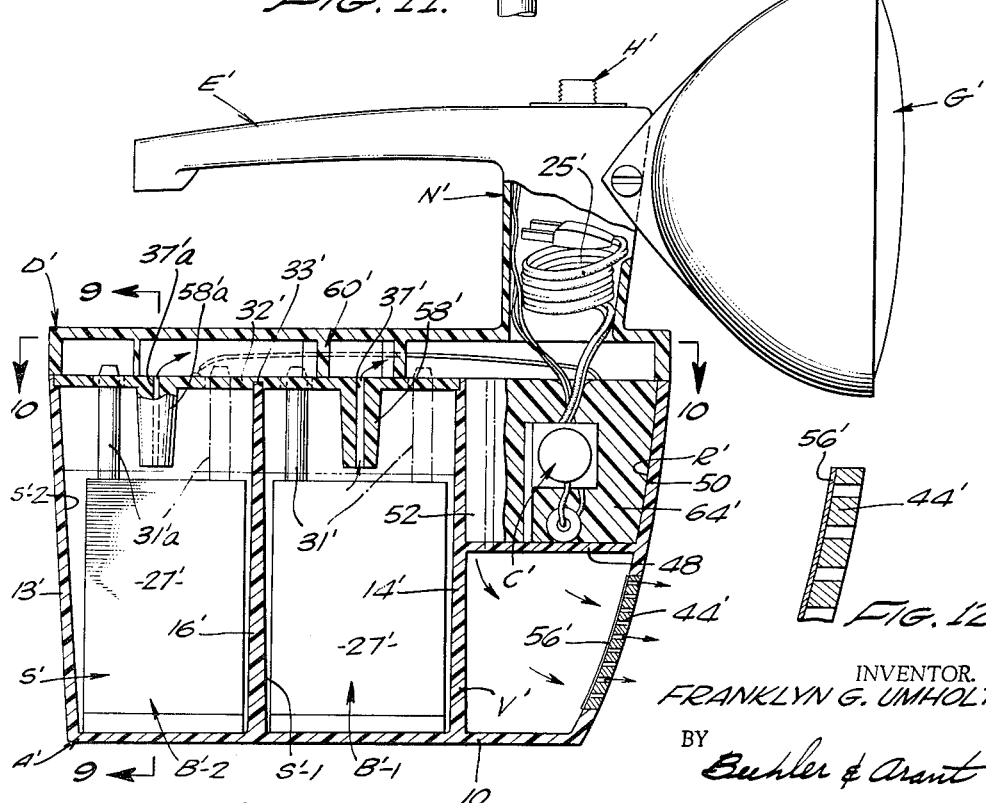

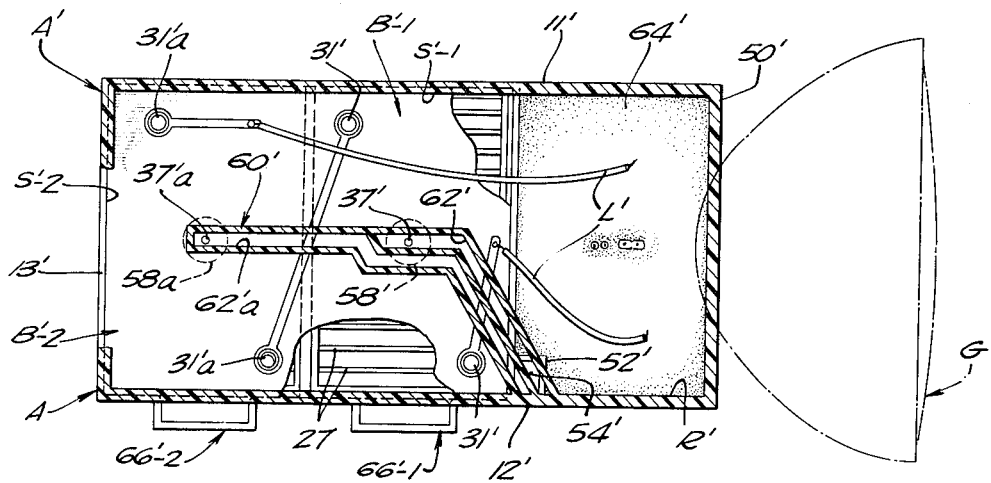
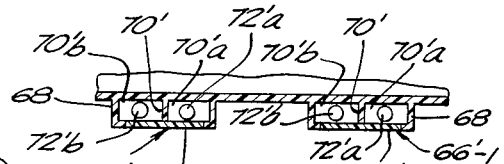
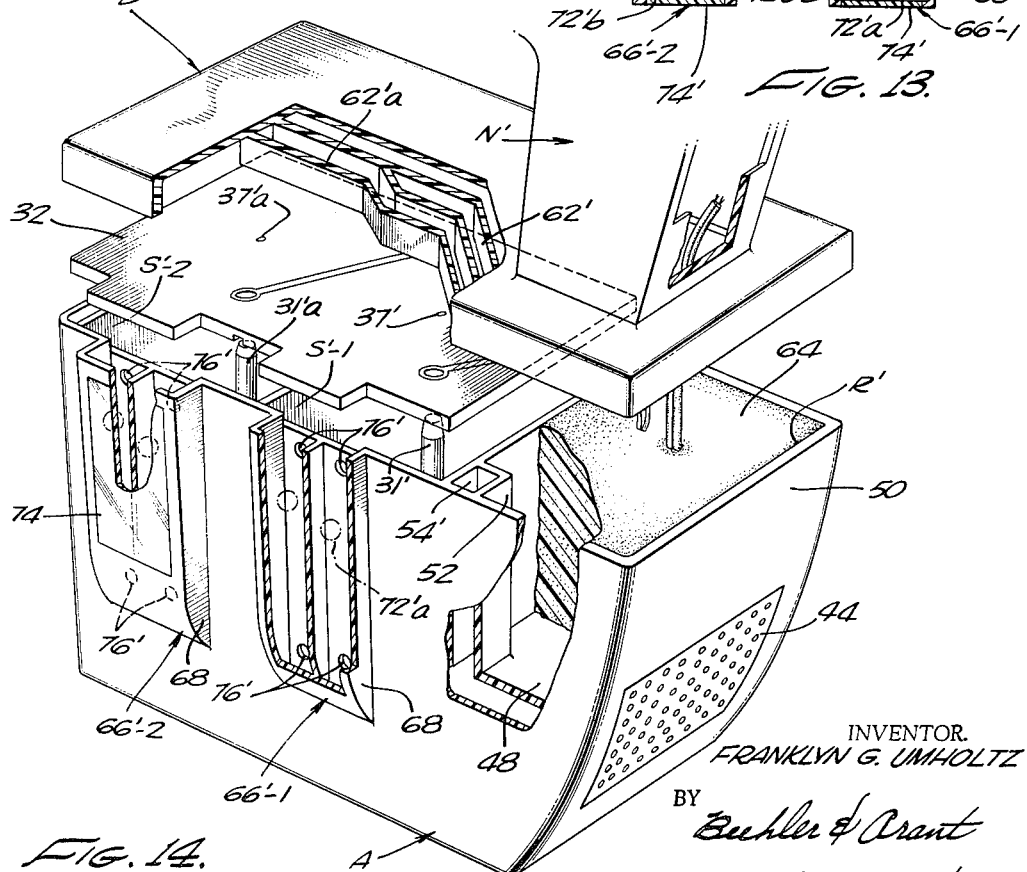

3,233,092
PORTABLE RECHARGEABLE LAMP
Franklyn G. Umholtz, Shutesburg, Mass., assignor of sixty percent to Edward W. Pape, Garden Grove, Calif.
Filed Dec. 11, 1964, Ser. No. 417,735
14 Claims. (Cl. 240—10.63)

This application is a continuation-in-part of my copending application Serial No. 187,824, filed April 16, 1962, now abandoned, and entitled Portable Rechargeable Lamp.

The present invention relates to a portable rechargeable lamp which includes a wet battery as the energy source and a self-contained recharging unit for the battery.

Many types of portable lamps powered with dry batteries have been known and used heretofore. An inherent defect of dry batteries is that within a few months, even without active usage, they deteriorate to such an extent that they no longer provide an adequate and reliable energy source. Furthermore, periodic replacement of the dry batteries is both inconvenient and uneconomical.

The primary object of this invention is to provide a self-contained portable lamp powered by a rechargeable storage battery, and including a recharging circuit, which is both efficient and economical in its operation.

Another object of the invention is to provide a lamp of the foregoing type which is easily and inexpensively manufactured.

A further object of the invention is to provide a lamp of the foregoing type which is attractive and stylish in its external appearance.

Yet a further object of the invention is to provide a portable rechargeable lamp having a carrying case which serves as a permanent receptacle for both the cells of the storage battery and its associated recharging unit.

The foregoing and other objects and advantages of the invention will be more readily understood from the following description considered in conjunction with the accompanying drawings, in which:

FIGURE 4 is a horizontal cross-sectional view of the carrying case, taken on the line 4—4 of FIGURE 2;

FIGURE 5 is a perspective view of the empty carrying case showing the manner of inserting the recharging unit support plate therein;

FIGURE 6 is a schematic diagram of the electrical circuit.

FIGURE 7 is a perspective view of a modified portable rechargeable lamp according to the invention;

FIGURE 8 is an enlarged cross-sectional view through the lamp in FIGURE 7 and taken on the line 8—8 of the latter figure;

FIGURE 9 is a cross-sectional view taken on the line 9—9 of FIGURE 8;

FIGURE 10 is a cross-sectional view taken on the line 10—10 of FIGURE 8;

FIGURE 11 is an enlarged detail of one of the terminals of the storage battery of the modified lamp;

FIGURE 12 is an enlarged section through a portion of the perforated ventilation cover mounted in the front end of the carrying case of the modified lamp;

FIGURE 13 is an enlarged horizontal cross-sectional view through certain battery charge indicating means embodied in the modified lamp; and FIGURE 14 is an enlarged exploded view of the modified lamp in perspective and partly in section.

Figure 1:
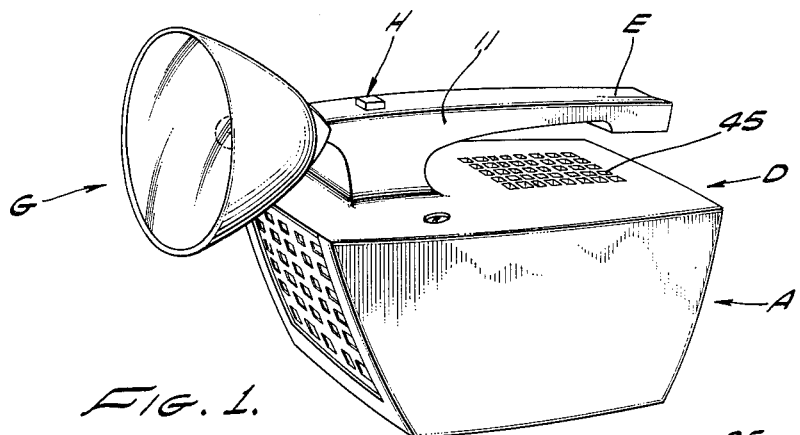
FIGURE 1 is a perspective view of the invention in its assembled form.
Figure 3:
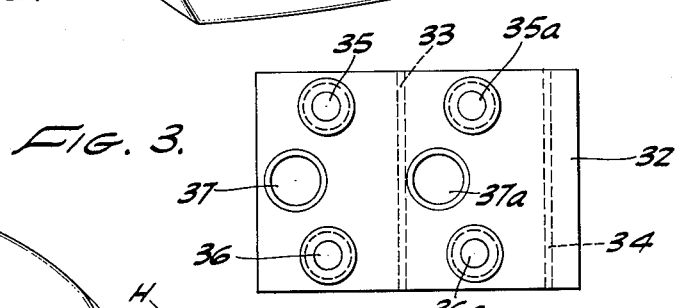
FIGURE 3 is a top plan view of the battery compartment cover.

Referring to these drawings it will be seen that the portable rechargeable lamp of the invention, as it is represented in FIGURES 1 through 6, includes a carrying case A having an upwardly opening battery compartment S in its rear end and an upwardly and forwardly opening recharger compartment R in its forward end. A pair of rechargeable storage batteries B-1 and B-2 are contained in separated parts of the battery compartment. A recharging unit C is disposed in the recharger compartment. A lid member D, held in removable engagement with the carrying case A, closes the tops of both the battery compartments and the recharger compartment, and also includes an upwardly extending hollow neck N upon which a lamp unit G and a switch H are carried. An elongate handle E extends rearwardly from the hollow neck, in spaced, substantially parallel relation to the lid member. Electrical circuit means I disposed within the hollow neck of the lid member D provide operative connections between the batteries B-1 and B-2, the recharging unit C, the lamp unit G, and the switch H. The carrying case A and lid member D are constructed of plastic or other material immune to corrosion by the electrolyte of the storage batteries.

Referring more specifically to the carrying case A it is seen to include a substantially flat bottom wall 10. Side walls 11 and 12 rise upwardly from the outer edges of the bottom wall 10. A rear end wall including an outer portion 13a and an inner portion 13b spaced inwardly therefrom joins the rear ends of the bottom wall and the side walls. A transverse wall 14 extends between the side walls 11 and 12 near the forward end of the carrying case and serves to define the forward boundary of the battery compartment. A divider wall 16, which is parallel to and located substantially midway between the transverse wall 14 and inner rear end wall portion 13b, serves to divide the battery compartment into two separate sub-compartments, S-1 and S-2, one of which contains the battery B-1 and the other of which contains the battery B-2.

Forwardly of the divider wall 14 a pair of parallel vertical slots 17, 18 are formed in the inner surfaces of side walls 11, 12, respectively. A slot 19 in the upper surface of the bottom wall 10 joins the ower ends of the side wall slots 17, 18.

Referring now to FIGURE 6 it will be seen that in the electrical circuit of the present lamp, the two batteries B-1 and B-2 are connected in electrical series to provide a maximum output voltage. Accordingly, the batteries have two output terminals T-1 and T-2. The switch H is a single-pole double throw switch having an intermediate open position. This switch includes an input terminal 20 connected to the battery terminal T-1, and output terminals 21 and 22 which are connected through high power and low power filaments, respectively, of the lamp unit G, to the other battery terminal T-2. Thus, when the switch H is closed to either lamp filament, the switch forms, with the respective filament and the battery, a series loop which is effective to energize the filament. It is possible to recharge the batteries by means of the recharger unit C. Recharger unit C includes a transformer 23 having a rectifier 24 connected in series with the secondary or output winding thereof. The output of the rectifier is in turn connected to the battery terminals T-1, T-2. A power cord 25 with a plug 25a for insertion into a wall receptacle, is connected to the primary winding of the transformer 23. When this power cord is connected to a source of alternating current, the secondary winding of the transformer and the rectifier 24 provide a D.C. recharging loop for the batteries.

As best seen in FIGURE 4, each of the batteries B-1 and B-2 includes, in the usual way, a plurality of metallic plates 27 mounted in spaced parallel relationship in the battery compartment S. Each of the batteries also includes a quantity of electrolyte 28, which occupies the spaces between the plates 27 and between the side walls 11, 12 of the carrying case A and the outermost battery plates. Thus it is seen that a significant feature of the present invention is the fact that the carrying case is adapted to receive the battery electrolyte in direct contact with its outer walls. To this end, the case is constructed of plastic or other material immune to corrosion by the electrolyte, as was stated earlier.

Each battery has a pair of terminals 31 which rise upwardly from the outermost plates 27. A battery cover 32 overlies the battery compartment and has grooves 33, 34 on its undersurface to receive divider wall 16 and inner end wall 13b, respectively. Cover plate 32 has openings 35, 36 through which the battery terminals 31 project for the necessary electrical connections to the circuit of FIGURE 6. The cover also has an opening 37 through which gases from battery B-1 are permitted to escape upwardly. Similar terminal and vent openings 35a, 36a, and 37a are provided for battery B-2.

Recharger unit C includes a flat plate 40 on which the transformer 23 and rectifier 24 are mounted. Support plate 40 slides in the grooves 17 and 18 of the side walls, and into the groove 19 in the bottom wall, of the plastic carrying case A.

The front end of the case A has an opening, the lower side of which is defined by a lower front wall portion 42 having a groove 43. A perforated removable end plate 44 is frictionally fitted in this opening with its lower edge seated within the groove 43, and provides the forward end wall of the recharger compartment. End plate 44 is removed by pulling its upper edge outward from the carrying case and then lifting the plate out of the groove 43. The purpose of the perforations in the end plate 44 is primarily ornamental. However, the openings also ventilate the recharger compartment for cooling purposes.

Lid member D includes a perforated area 45 overlying the vent openings 37, 37a in the battery cover 32. Gases escaping from the battery cells via the openings 37 and 37a are thereby permitted to escape from the carrying case into the surrounding atmosphere. If desired, the vent openings may be sealed with a microporous material which is permeable to the gases but not to the electrolyte.

Figure 2:
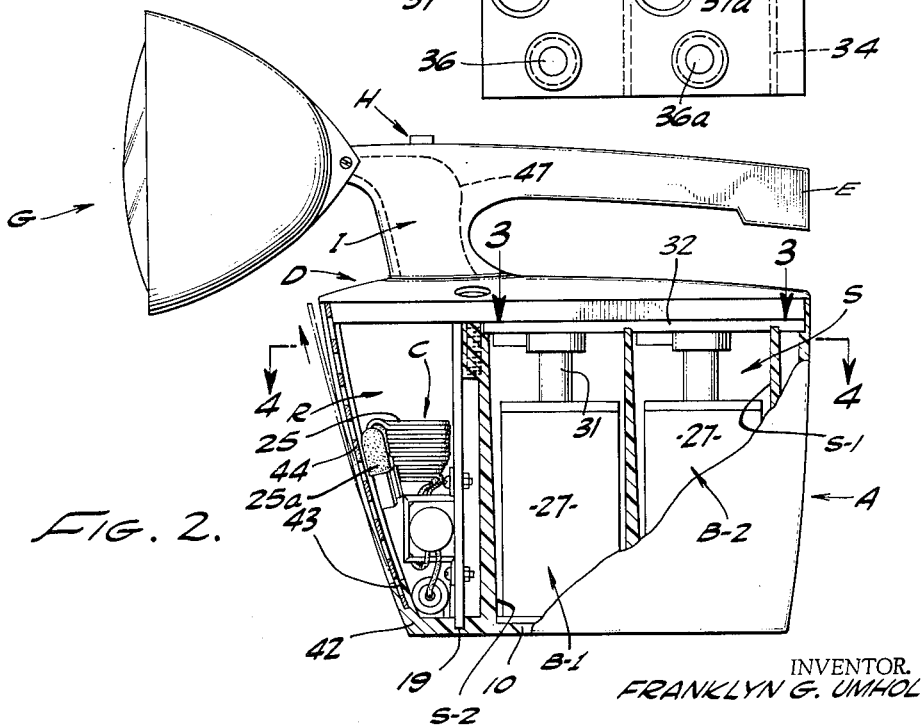
FIGURE 2 is a side elevational view of the invention, partially in cross-section.

Lamp unit G is conventional and is pivotally mounted on the upper forward extremity of the hollow neck of lid member D. The interior cavity of this neck is indicated in FIGURE 2 by means of dotted lines 47. Leads of the electrical circuit I (not shown in FIGURE 2) extend through the neck cavity 47 to connect the lamp unit G and switch H to the batteries B-1, B-2 in the manner indicated in the schemtaic diagram of FIGURE 6.

A feature of the lamp under consideration is that the lid member D is removably fastened to the top of the carrying case A. A pair of enlargements 14a, 14b are provided on the forward side of the transverse wall 14 to receive screws for holding the lid member D in place.

Reference is now made to FIGURES 7-14 which illustrate an alternative rechargeable lamp construction according to the invention. This alternative lamp construction is basically similar to the lamp construction of FIGURES 1 through 6 and includes a carrying case A' which is similar in shape and appearance to the carrying case of the earlier lamp. Case A' has a bottom wall 10', side walls 11' and 12' which rise from opposite sides of the bottom wall, a rear wall 13', and a front wall 50' which is not included in the carrying case of the earlier lamp. Extending across the inside of the case A', between the side walls 11', 12' thereof, is an internal wall 14' which defines, with the side walls, and the rear case wall 13', a storage battery compartment S'. Extending across this battery compartment, between the side walls of the carrying case, is a wall 16' which divides the battery compartment S' into two subcompartments S'-1 and S'-2. In the forward end of the carrying case A' is an upwardly opening recharger compartment R'. In contrast to the recharger compartment in the earlier lamp, the recharger compartment R' in the lamp of FIGURES 7-14 occupies only the upper half of the carrying case A', thereby to define in the forward end of the case, below the recharger compartment, a compartment V' which is not present in the earlier lamp. Compartment V' is hereinafter referred to as a vent compartment, for reasons which will appear presently. The recharger compartment R' and the vent compartment V' are separated by a wall 48' which is joined to the walls 11', 12', 14' and 50' of the carrying case A'. On the forward side of the wall 14', contiguous to the side wall 11' of the carrying case, is an enlargement 52' which extends from the upper edge of the wall 14' to the lower wall 48 of the recharger compartment R'. Extending longitudinally through this enlargement is a vent passage 54' which opens, at its lower end, into the vent compartment V'.

The front wall 50' of the carrying case A' has a rectangular opening to the vent compartment V' in which is positioned a perforated plate 44'. Plate 44' is cemented or otherwise permanently secured in the front wall opening. Cemented to the inner surface of the perforated plate 44', so as to cover the opening therein, is a sheet 56' of microporous material which is permeable to gaseous fluids but impermeable to liquids. The purpose of this microporous sheet will be explained presently.

In the battery compartment S' are two batteries B'-1 and B'-2. Each of these batteries includes a series of spaced parallel plates 27'. A pair of upstanding terminals 31' are joined to the outer plates 27' of the forward battery B'-1. A similar pair of upstanding terminals 31a' are joined to the outer plates of the rear battery B'-2. The spaces between the battery plates and between the outer plates and the side walls 11', 12' of the carrying case A' are filled with electrolyte. A feature of the lamp under consideration, like the earlier lamp, thus resides in the fact that the electrolyte directly contacts and is contained by the walls of the carryin case A'.

Overlying the battery compartment S' is a battery cover 32'. This battery cover is supported by the case walls 13', 14' and 16' in such manner that the upper surface of the cover is flush with the upper edge of the case A'. To this end, the upper edge of the central wall 16' of the battery compartment is located a small distance below the upper edge of the case. In addition, the forward surface of the case wall 13' and the rear surface of the case wall 14' are rabbeted, as shown, to receive the ends of the battery cover. If desired, the ends of the battery cover may also be rabbeted in the manner illustrated to meet with the rabbets in the case walls. The undersurface of the battery cover has a transverse groove 33' to receive the upper edge of the case wall 16'.

Depending from the undersurface of the battery cover 32' are two bosses 58' and 58a'. Extending through the boss 58' is a vent passage 37' through which gases may vent from the forward battery B'-1. Extending through the other boss 58a' is a vent passage 37a' through which gases may vent from the rear battery B'-2. In the lamp under consideration, the battery cover plate 32' is cemented or otherwise permanently secured to the carrying case A'.

Positioned on top of the carrying case A' is a lid D' which is similar in shape and appearance to the lid member of the previous lamp. In contrast to the latter lamp, however, the lid member D' in the lamp of FIGURES 7-14 is cemented or otherwise permanently secured to the case A'. The lid member D' has a hollow, upstanding neck N' adjacent its forward end. An elongate handle E' extends rearwardly from this neck in spaced, substantially parallel relation to the lid member D'. Handle E' mounts a single pole, double throw switch H' having a central open position, like the switch H in the earlier lamp. A lamp unit G' is pivotally secured to the forward upper extremity of the neck N'.

An important feature of the alternative lamp construction under consideration resides in a wall formation 60' which depends from the undersurface of the lid member D'. When the lid member is assembled on the carrying case A', the normally lower edges of the wall formation 60' engage and are cemented to the upper surface of the battery cover 32'. Wall formation 60' defines two separate vent passages 62' and 62a'. The rear end of the passage 62' overlies the forward vent passage 37' in the battery cover 32'. The rear end of the passage 62a' overlies the rear vent passage 37a' in the battery cover. The forward end of the wall formation 60' extends diagonally across the undersurface of the lid member D' to a position over the enlargement 52' which extends downwardly through the recharger compartment R' to the bottom wall 48' of the latter compartment. The forward ends of the vent passages 62', 62a' in the wall formation open to the upper end of the vent passage 54' in this enlargement. It is apparent, therefore, that the vent passages 62', 62a' in the wall formation 60' and the vent passage 54' in the enlargement 52' are effective to conduct gases from the battery compartment S' to the vent compartment V' in the forward end of the carrying case A', from whence the gases may vent to atmosphere through the pores in the microporous sheet 56' and the openings in the perforated plate 44' which is fixed in the front opening to the vent compartment V'.

In actual practice, the vent passages in the battery cover 32 of the lamp shown in FIGURES 1–6 and the vent passages in the battery cover 32' of the lamp shown in FIGURES 7–14 are preferably made sufficiently small in diameter that they will freely conduct gas from the lamp batteries but will impede leakage of electrolyte from the batteries. In the lamp of FIGURES 1–6 the space between the battery cover 32 and the lid member D defines a well in which any electrolyte which does leak from the batteries may collect and evaporate. In the alternative lamp construction of FIGURES 7–14, the forward vent compartment V' provides a well which receives any electrolyte which leaks from the batteries. The microporous sheet 56' is cemented to the inner surface of the perforated plate 44' to permit gases to escape from the compartment while preventing the leakage of electrolyte from the compartment. Accordingly, any electrolyte which does enter the vent compartment V' remains trapped in the compartment until it evaporates.

Contained in the recharge compartment R' is a battery recharging unit C'. A feature of the lamp under consideration resides in the fact that the recharging unit C' is incased in potting compound 64' which completely fills the recharger compartment R' to the level of the upper edge of the carrying case A'. The batteries B'–1, B'–2, lamp unit G', switch H', and the recharging unit C' are electrically connected in precisely the same way as illustrated in FIGURE 6. Referring to FIGURE 10, it will be observed that the electrical circuit which connects the batteries to the recharging unit includes leads L' which are brazed or otherwise electrically and mechanically secured to the upper ends of the battery terminals 31', 31a'. These terminals project upwardly through openings in the battery cover 32' to permit this connection. The leads L' extend forwardly to the recharger compartment R' where they enter the potting compound which fills the compartment.

The power cord 25' which leads from the recharging unit C', for connection of the unit to an A.C. power supply, such as a well receptacle, emerges from the upper surface of the potting compound in the recharger compartment and extends upwardly through the internal cavity in the neck N' of the lid member D'. When the power cord is not in use, it is coiled and stored in this cavity. If desired, means may be provided for releasably securing the power cord in the cavity.

An additional unique and important feature of the lamp under consideration resides in a pair of battery charge indicating means 66'–1 and 66'–2 which are visible from the exterior of the carrying case A' to permit the operator of the lamp to visually determine the state of charge of the batteries B'–1 and B'–2. Conceivably, these charge indicating means may comprise electrical meters. In the drawings, however, each indicating means 66'–1 and 66'–2 comprises a chamber 68' integral with and projecting outwardly from the side wall 12' of the carrying case A'. Each chamber contains a vertical internal partition 70' which divides the respective chambers into two vertically elongated chamber spaces 70a' and 70b'. These chamber spaces contain floats 72a' and 72b', respectively. Each chamber has a transparent window 74' through which the floats are visible.

The chamber 68 of the forward charge indicating means 66'–1 is aligned with the forward battery compartment S'–1 and opens to the latter compartment through ports 76'. The chamber 68' of the rear charge indicating means 66'–2 is aligned with the rear battery compartment S'–2 and opens to the latter compartment through ports 76'. It is apparent, therefore, that the chambers 68 of the charge indicating means are filled with electrolyte to the level of the electrolyte in their respective battery compartments. Thus, the level of the electrolyte in the battery compartments may be visually observed through the windows 74' of the charge indicating means. The floats in the chambers of the charge indicating means are weighted in such manner that the positions of the floats relative to the surface of the electrolyte indicates the state of charge of the batteries. For example, the two floats for each battery may be so weighted that one float sinks when the respective battery reaches a given state of discharge and the other float sinks when the battery reaches some predetermined greater state of discharge. If desired, the two floats for each battery may be differently colored to permit them to be easily distinguished.

It is apparent, therefore, that the invention herein described and illustrated is fully capable of obtaining the several objects and advantages preliminarily set forth.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

What is claimed is:

1. A portable, rechargeable lamp comprising in combination: a carrying case having an upwardly opening battery compartment in the rear end portion thereof and an upwardly opening recharger compartment in the forward end portion thereof; a rechargeable storage battery in said battery compartment including an electrolyte and a plurality of battery plates; a recharging unit in said recharger compartment including an externally accessible power cord for connection to an external power source; a lid member secured to the top of said carrying case including a hollow upstanding neck having an internal cavity communicating with both said battery compartment and said recharging compartment; a handle extending rearwardly from said neck; a lamp unit secured to said neck; a switch carried on said neck; electrical circuit means extending through said neck and electrically interconnecting said battery, said recharging unit, said lamp unit, and said switch; and means defining a vent passage communicating said battery compartment to atmosphere for venting gases from said battery compartment.

2. A lamp as defined in claim 1 wherein said electrolyte is contained by and directly contacts the side and bottom walls of said carrying case; and said lid member and carrying case are constructed of a material, such as plastic, which is immune to corrosion by said electrolyte.

3. A lamp as defined in claim 1 wherein: said lid member has a perforated area overlying said battery compartment and comprising said vent passage.

4. A lamp as defined in claim 1 wherein: said carrying case has a perforated wall with openings communicating to said battery compartment and forming said vent passage.

5. A lamp as defined in claim 1 including: a microporous member extending across said vent passage; and said microporous member being relatively permeable to gases from said battery compartment and relatively impermeable to said electrolyte.

6. A lamp as defined in claim 1 wherein: said power cord is stored in said charger compartment when not in use; and the front wall of said recharger compartment being removable to permit access to said power cord.

7. A lamp as defined in claim 1 wherein: said power cord is stored in said neck cavity when not in use.

8. A lamp as defined in claim 1 including: externally visible means on said carrying case for indicating the state of charge of said battery.

9. A portable, rechargeable lamp comprising, in combination: a plastic carrying case having an upwardly opening battery compartment formed in the rearward end portion thereof and an upwardly and forwardly opening recharger compartment formed in the forward end portion thereof; a wet battery including an electrolyte and a plurality of battery plates disposed in said battery compartment; a recharging unit disposed in said recharger compartment; an integrally formed plastic lid member closing the upper portion of said carrying case, said lid member having an opening above said battery compartment for permitting the escape of gases therethrough, said lid member also having a hollow neck which rises upwardly therefrom and whose interior communicates with both said battery compartment and said recharging compartment; a handle extending rearwardly from said hollow neck; means removably fastening said lid member to said carrying case; a lamp unit pivotally mounted on the forward side of said hollow neck; a switch carried on said hollow neck; and electrically interconnecting said battery, said recharging unit, said lamp unit, and said switch.

10. A lamp as claimed in claim 9 in which said carrying case is integrally formed and said electrolyte is in direct contact with the plastic side walls and bottom wall of said battery compartment.

11. A lamp as claimed in claim 9 which further includes a member closing the forward end of said recharging compartment and which is removable therefrom without removing said plastic lid member.

12. A lamp as claimed in claim 9 wherein said means removably fastening said lid member to said carrying case includes screw threads in said plastic carrying case adjacent the forward end of the battery compartment and the rear portion of the recharger compartment; and screws engaging said screw threads and extending through said lid member.

13. A portable, rechargeable lamp comprising in combination: a carrying case having an upwardly opening battery compartment in the rear end portion thereof, an upwardly opening recharger compartment in the forward end portion thereof, and a vent compartment below said recharger compartment; a rechargeable storage battery in said battery compartment including an electrolyte and a plurality of battery plates; a recharging unit in said recharger compartment including a power cord for connection to an external power source; a lid member secured to the top of said carrying case including a hollow upstanding neck having an internal cavity communicating to said recharger compartment; said power cord extending to said cavity and being stored in said cavity when not in use; a handle extending rearwardly from said neck; a lamp unit secured to said neck; a switch carried on said neck; electrical circuit means extending through said neck and electrically interconnecting said battery, said recharging unit, said lamp unit, and said switch; means defining a vent passage communicating said battery compartment to said vent compartment; said carrying case having a perforated front wall with openings to said vent compartment; a microporous member extending across the openings in said perforated front wall; and said microporous member being relatively permeable to gases from said battery compartment and relatively impermeable to said electrolyte.

14. A lamp as defined in claim 12 wherein: said vent passage defining means comprises means defining a passage extending vertically through said recharger compartment from the top of said carrying case to said vent compartment, and a wall formation on the undersurface of said lid member defining a passage communicating at one end to said battery compartment and communicating at its other end to the upper end of said vertical passage.

References Cited by the Examiner

UNITED STATES PATENTS

| | | | |
|---|---|---|---|
| 2,272,744 | 2/1942 | Helling | 240—10.63 |
| 2,312,463 | 3/1943 | Zdansky. | |
| 2,565,674 | 8/1951 | Zachlin | 136—177.21 |
| 2,582,330 | 1/1952 | Hautala | 240—10.63 X |
| 2,611,072 | 9/1952 | Potekin | 240—10.63 |
| 2,693,499 | 11/1954 | Neumann | 136—177 |
| 2,942,102 | 6/1960 | Stoutenburgh | 240—10.63 |

NORTON ANSHER, *Primary Examiner.*